United States Patent [19]
Röhm

[11] Patent Number: 5,503,409
[45] Date of Patent: Apr. 2, 1996

[54] SELF-TIGHTENING HAMMER-DRILL CHUCK

[76] Inventor: Günter Röhm, Heinrich-Röhm-Strasse 50, D-89567 Sontheim, Germany

[21] Appl. No.: 352,372

[22] Filed: Dec. 8, 1994

[30] Foreign Application Priority Data

Dec. 15, 1993 [DE] Germany .......................... 43 42 765.0
Mar. 28, 1994 [EP] European Pat. Off. .............. 94104874

[51] Int. Cl.[6] .................................................. B23B 31/12
[52] U.S. Cl. .............................. 279/62; 279/140; 279/902
[58] Field of Search ............................ 279/60–65, 140, 279/902

[56] References Cited

U.S. PATENT DOCUMENTS

| 5,145,194 | 9/1992 | Huff et al. ................................ 279/140 |
| 5,411,275 | 5/1995 | Huff et al. ................................ 279/140 |

FOREIGN PATENT DOCUMENTS

| 3411127 | 10/1985 | Germany ................................ 279/62 |
| 3434112 | 3/1986 | Germany ................................ 279/60 |

*Primary Examiner*—Steven C. Bishop
*Attorney, Agent, or Firm*—Herbert Dubno; Andrew Wilford

[57] ABSTRACT

A drill chuck has a chuck body centered on and rotatable about an axis and formed with a plurality of jaw guides angularly spaced about the axis and all inclined axially forwardly and with an axially directed annular inner bearing track centered on the axis. Respective jaws in the guides are each formed with a row of teeth that can mesh with a screwthread of an adjustment sleeve generally axially fixed on the body and rotatable on the body in a tightening direction to displace the jaws axially forward and radially toward one another and in an opposite loosening direction to displace the jaws axially backward and radially away from one another. The adjustment sleeve is formed with an axially directed annular inner bearing track centered on the axis and axially confronting the inner bearing track of the chuck body and one of the inner bearing tracks is substantially planar and perpendicular to the axis and the other inner bearing track is substantially frustoconical and angled outwardly away from the one inner bearing track. An array of bearing balls is axially engaged between the inner bearing tracks and a locking ring rotatable on the chuck body and formed with a radially inwardly directed and substantially frustoconical outer track bearing radially inward on the bearing balls. A tightening screwthread on the locking ring axially displaces the locking ring relative to the chuck body on relative rotation of the adjustment sleeve and locking ring.

20 Claims, 10 Drawing Sheets

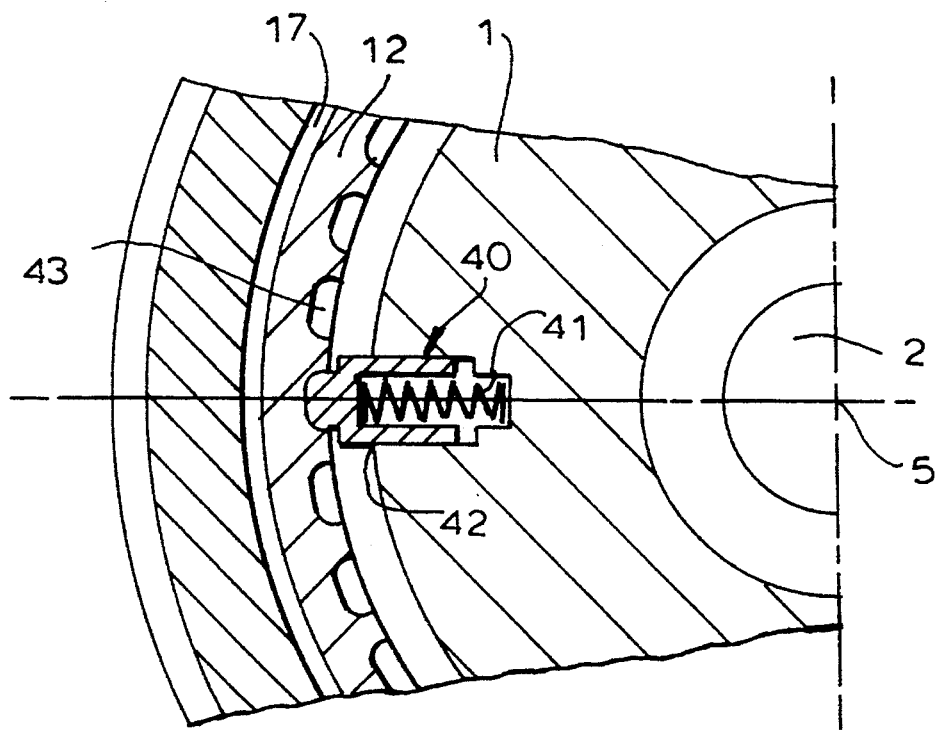
F I G. 5
F I G. 6
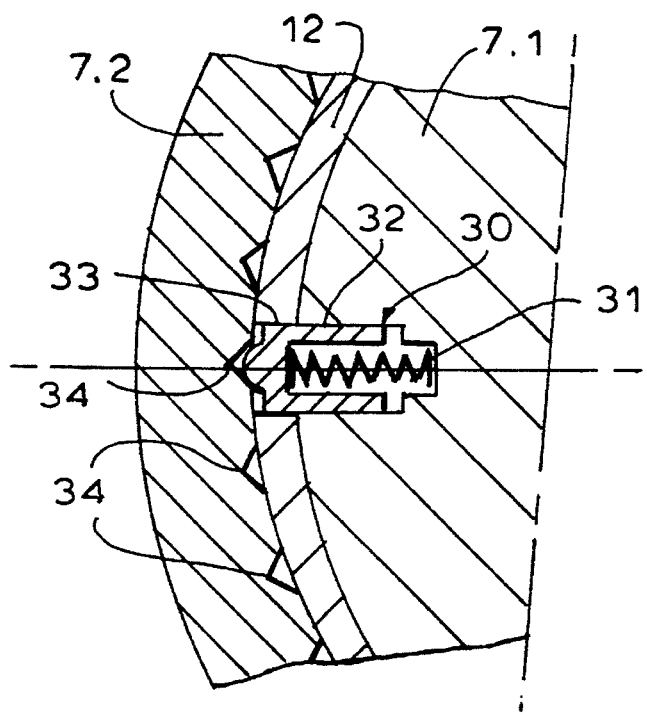
F I G. 7
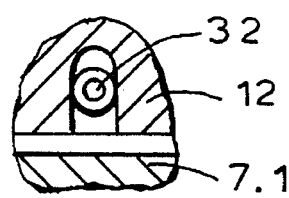

FIG. 8
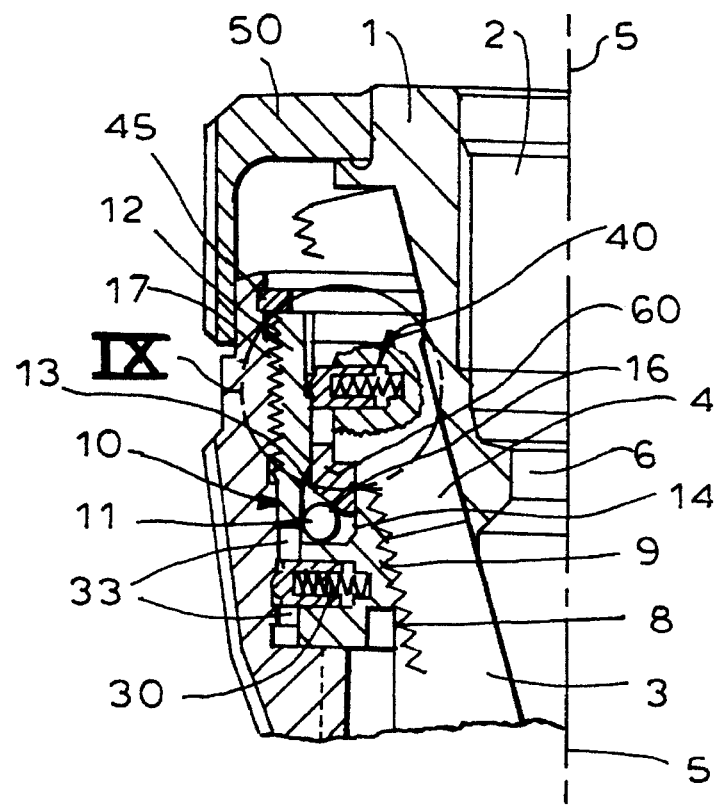
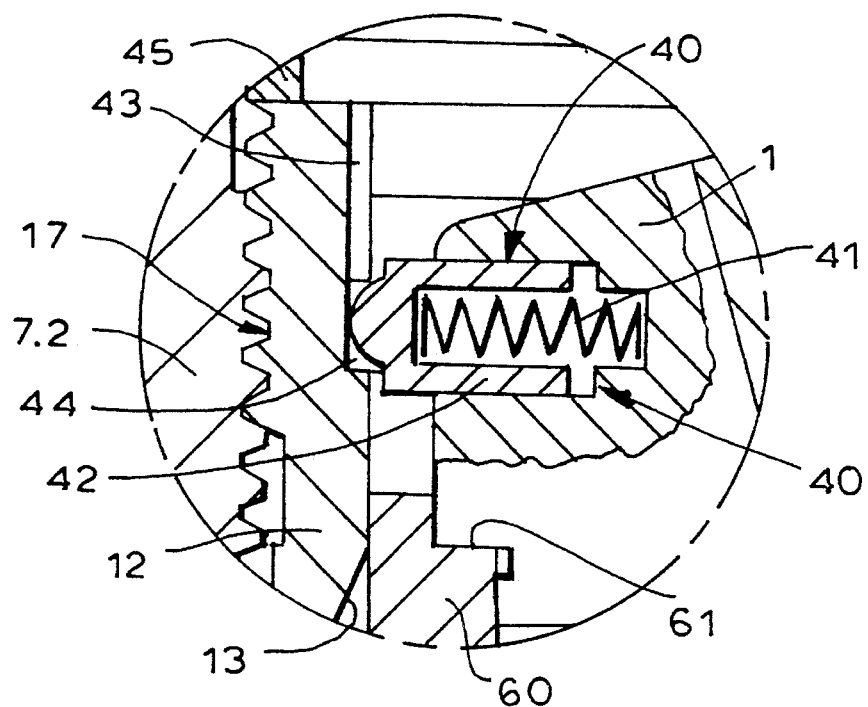
FIG. 9

SELF-TIGHTENING HAMMER-DRILL CHUCK

FIELD OF THE INVENTION

The present invention relates to a drill chuck. More particularly this invention concerns a self-tightening chuck for a hammer drill.

BACKGROUND OF THE INVENTION

A standard hammer-drill chuck has a chuck body centered on and rotatable about an axis and formed with a plurality of jaw guides angularly spaced about the axis and all inclined axially forwardly. Respective jaws are provided in the guides, each formed with a row of teeth. An adjustment sleeve generally axially fixed on the body is formed with an adjustment screwthread meshing with the rows of teeth of the jaws so that when the sleeve is rotated on the body in a tightening direction the jaws are displaced axially forward and radially toward one another and when rotated in an opposite loosening direction the jaws are displaced axially backward and radially away from one another. An array of bearing balls is axially engaged between the sleeve and a locking ring rotatable on the chuck body.

According to German patent document 3,411,127 two such ball bearings are provided, axially spaced from each other. The locking ring has a radially projecting flange that engages between the bearings to axially fix it on the chuck body. The balls of the bearings ride on corrugated tracks that increase the clamping pressure when the ball ride up on the ridges. Such a chuck can, however, loosen fairly easily, especially when used in a hammer drill.

OBJECTS OF THE INVENTION

It is therefore an object of the present invention to provide an improved drill chuck.

Another object is the provision of such an improved drill chuck which overcomes the above-given disadvantages, that is which is easy to get very tight and that stays tight even when subjected to considerable abuse.

SUMMARY OF THE INVENTION

A drill chuck has according to the invention a chuck body centered on and rotatable about an axis and formed with a plurality of jaw guides angularly spaced about the axis and all inclined axially forwardly and with an axially directed annular inner bearing track centered on the axis. Respective jaws in the guides are each formed with a row of teeth that can mesh with a screwthread of an adjustment sleeve generally axially fixed on the body and rotatable on the body in a tightening direction to displace the jaws axially forward and radially toward one another and in an opposite loosening direction to displace the jaws axially backward and radially away from one another. The adjustment sleeve is formed with an axially directed annular inner bearing track centered on the axis and axially confronting the inner bearing track of the chuck body and one of the inner bearing tracks is substantially planar and perpendicular to the axis and the other inner bearing track is substantially frustoconical and angled outwardly away from the one inner bearing track. An array of bearing balls is axially engaged between the inner bearing tracks and a locking ring rotatable on the chuck body and formed with a radially inwardly directed and substantially frustoconical outer track bearing radially inward on the bearing balls. A tightening screwthread on the locking ring axially displaces the locking ring relative to the chuck body on relative rotation of the adjustment sleeve and locking ring.

To tighten the chuck according to the invention the lock ring is turned in the closing direction until the jaws come into engagement with the shaft of the tool. This blocks further forward rotation of the adjustment sleeve so that the adjustment sleeve and locking ring rotate relative to each other and the outer track of the locking ring moves so as to push in the balls and provide an extra degree of tightening with a high mechanical efficiency, making it possible to get the chuck as tight by hand as in prior-art key-actuated systems. The amount of clamping force that can be achieved in way is much more than in prior-art chucks since the tightening screwthread can be of a shallow high-efficiency pitch and the axial movement of the locking ring is translated by the angled outer track into a small movement of the balls to tighten the chuck. On reverse rotation to open the chuck the movements are reversed so first the tightening screwthread is effective to move back the locking ring, then the adjustment sleeve rotates in the normal manner.

According to the invention the tightening screwthread is also formed in part on the chuck body and has a hand such that when the locking ring is rotated in the chuck body in the tightening direction the locking ring moves axially and cams in the balls with the outer track. More particularly, the tightening screwthread is of such a hand that when the locking ring is rotated in the tightening direction the locking ring moves axially forward on the chuck body. The outer track is flared axially forwardly. In addition a first coupling is engaged between the locking ring and the chuck body to resist relative rotation so long as the locking ring and chuck body are relatively rotated with less than a predetermined torque. This first coupling is constituted such that it resists relative rotation in the tightening direction with a force greater than the force with which it resists relative rotation in the opposite direction. It includes a pin displaceable in the body toward and away from the locking ring, an annular array of recesses in the locking ring in which the pin is engageable, and a spring braced between the pin and the body urging the pin toward the locking ring. The recesses each have a pair of differently inclined and angularly oppositely directed flanks engageable by the pin so that the first coupling resists relative rotation in the tightening direction with a force greater the force with it resists opposite rotation direction.

In addition according to the invention a second coupling is engaged between the locking ring and the adjustment sleeve and resists relative rotation of the ring and sleeve with a predetermined force. This second coupling is formed by an O-ring set in the adjustment sleeve and bearing radially inwardly on the locking ring. The adjustment sleeve includes an inner part formed with the respective inner track and part of the adjustment screwthread and an outer part rotatable relative to the inner part. Here a first coupling is engaged between the parts resisting relative rotation thereof so long as the parts are relatively rotated with less than a predetermined torque. In this arrangement means is provided for rotationally permanently coupling the locking ring with the inner part. The tightening screwthread is between the outer part and the locking ring. In addition a second coupling is engaged between the chuck body and the locking ring and rotationally couples same together except in a rearmost position of the locking ring on the chuck body. This second coupling includes a pin radially displaceable in the chuck body, an array of axially extending grooves in the locking ring in which the pin is radially engageable, a spring urging the pin radially into the grooves, and an annular groove in which the pin is engageable in the rearmost position of the locking ring. The outer part is provided with an abutment ring against which the locking ring is engaged in the rearmost position. Furthermore the locking ring is rotationally fixed and axially displaceable on the outer part and the chuck body includes a chuck-body ring that forms the respective inner track and that is axially shiftable on the chuck body. The chuck body and chuck-body ring have axially engageable annular surfaces that when engaged rotationally couple the chuck body and chuck-body ring together. The chuck further has according to the invention a spring urging the axially engageable surfaces apart. In this embodiment the axially engageable surfaces are substantially frustoconical and centered on the axis.

The spring that urges the axially engageable surfaces apart is braced between the sleeve and the chuck-body ring. In addition the balls each engage the tracks at three angularly offset locations. The location at which each ball engages the outer track forms with the center of the respective ball a line generally bisecting an angle formed between lines between the other locations and the center of the ball. The locations are angularly equispaced around the balls. Furthermore at least one of the tracks can be formed with alternating hills and valleys.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 5, 6, and 7 are large-scale sections taken along respective lines V—V, VI—VI, and VII—VII of FIG. 4;

FIG. 8 is a detail of FIG. 4 but in another operational position;

FIG. 9 is a large-scale view of a detail of FIG. 8;

SPECIFIC DESCRIPTION

Figure 1:
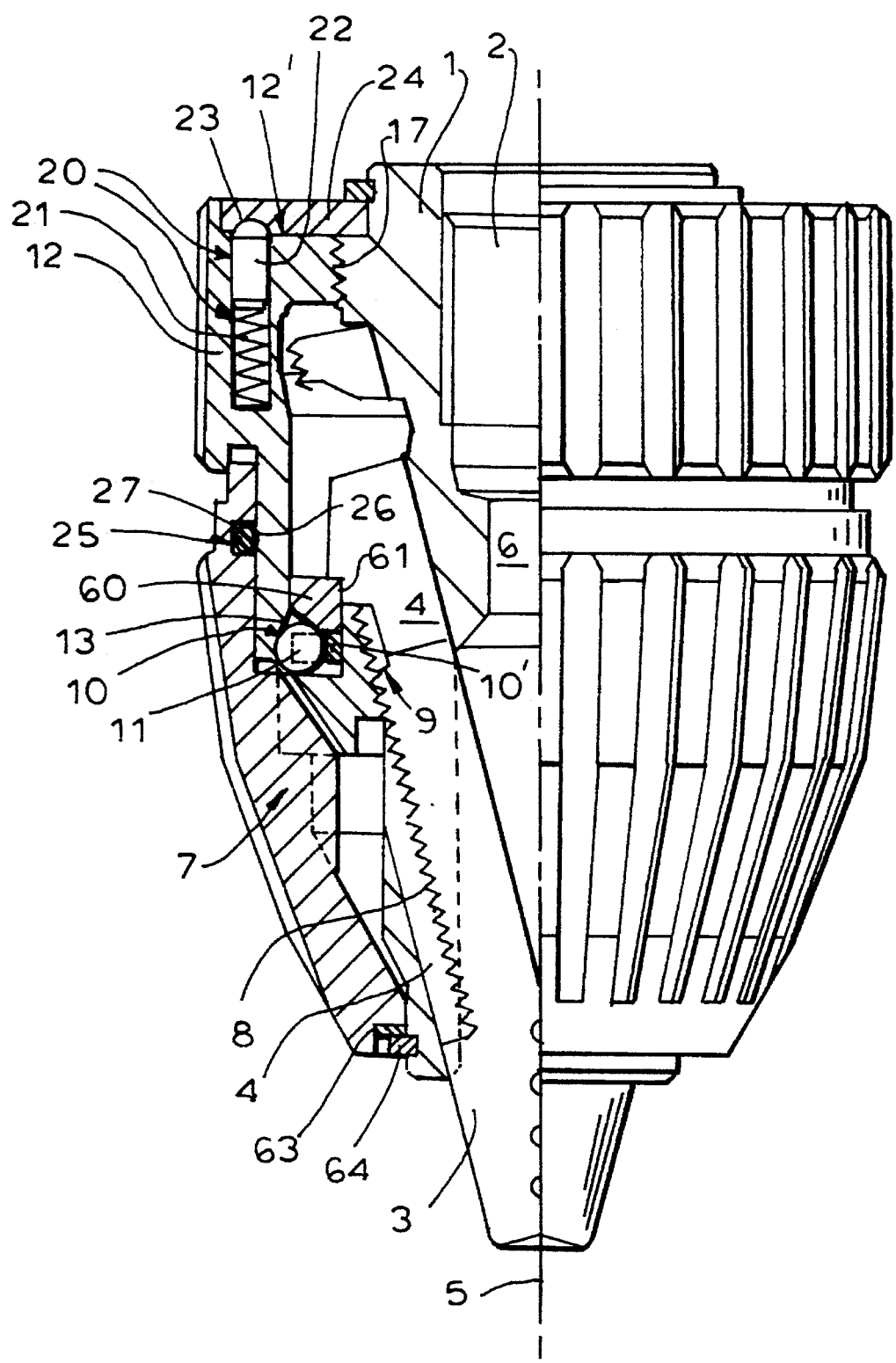
FIG. 1 is a side view partly in axial section through a first embodiment of the invention.
Figure 2:
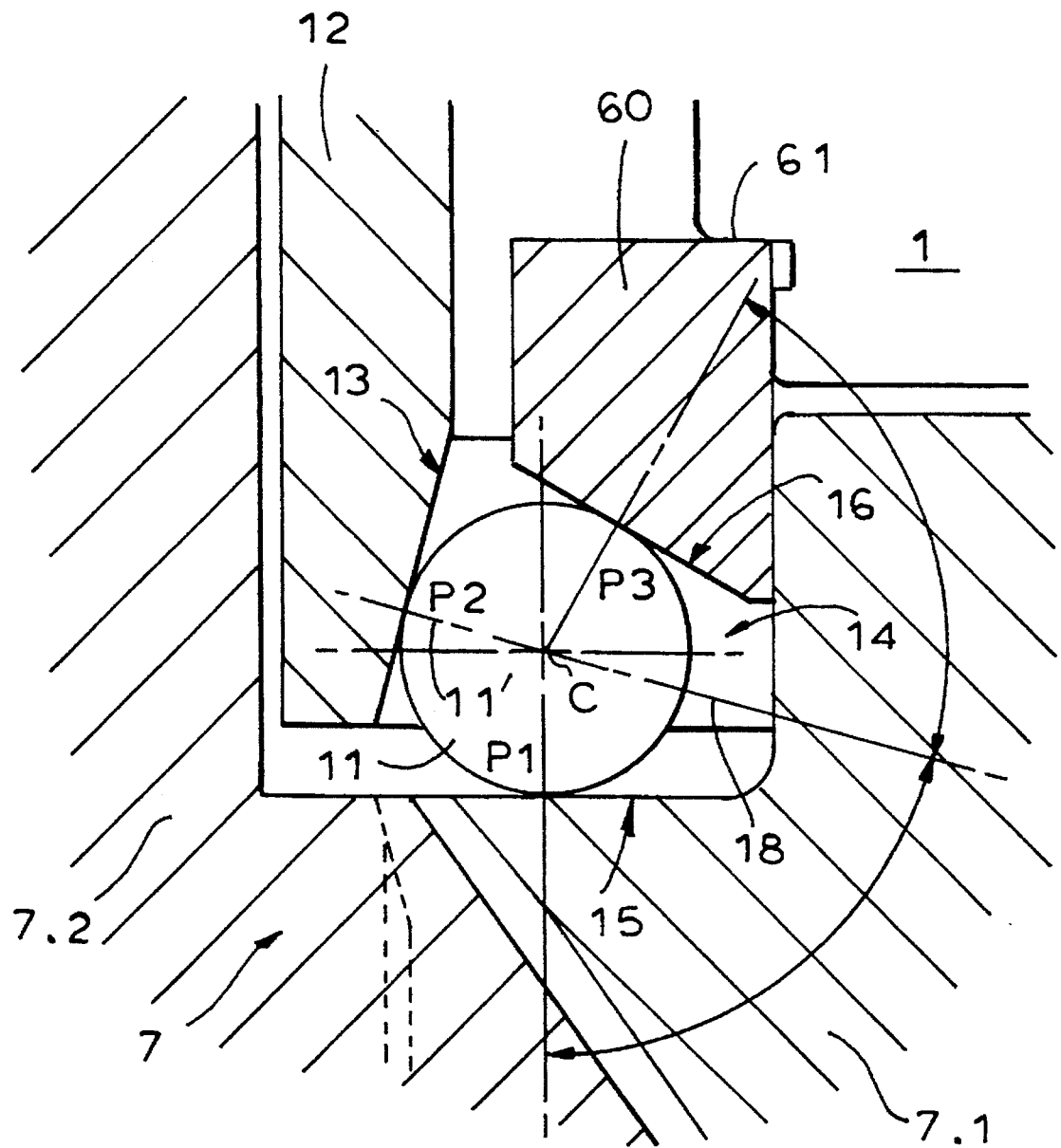
FIG. 2 is a large-scale view of a detail of FIG. 1.

As seen in FIGS. 1 and 2 a chuck according to the invention has a machined steel chuck body 1 centered on and rotatable about an axis 2 and formed with a rearwardly open threaded hole 2 by means of which it is mounted on the spindle of an unillustrated hammer drill having a hammer rod that can engage through an axial passage 6 of the body 1. A plurality of jaws 3 can move in angularly equispaced and inclined guide bores or passages 4 of the body 1, each jaw 3 having a radial outer edge formed with a row of teeth 8.

An adjustment sleeve 7 can rotate about the axis 5 on the body 1 and is internally formed with a frustoconical screwthread 9 meshing with the teeth 8 so that when turned in a tightening direction the jaws 3 move axially forward and radially inward and when oppositely rotated in a loosening direction the jaws 3 move axially back and radially out. A ball bearing 10 is braced axially between the sleeve 7 and the body 1 to permit the two to rotate freely relative to each other. The sleeve 7 can move slightly axially on the body 1 by deformation of a spring washer 62 braced between a front end of the sleeve 7 and a snap ring 64 set in the front end of the body 1, but can be considered to be generally axially fixed on the body 1.

A locking ring 12 is coupled by a screwthread 17 to the body 1 so that when the ring 12 is rotated about the axis 5 on the body 1 it will move axially thereon. The outer surfaces of the sleeve 7 and ring 12 are identically ridged and form smooth continuations of each other.

As better seen in FIG. 2, the sleeve 7 is actually formed by an inner part 7.1 and an outer part 7.2 axially and rotationally coupled to each other by interengaging teeth. The sleeve 7 forms an axially backwardly directed track or surface 15 lying in a plane perpendicular to the axis 5 and engaging balls 11 of the bearing 10. The body 1 is fitted with a ring 60 bearing axially backward against a shoulder 61 and forming an axially forwardly direct annular surface or track 16 which here is frustoconical and tapered outwardly back away from the surface 15 to form a radially outwardly open and radially outwardly flaring groove 14 receiving the balls 11. The locking ring 12 is formed with a radially inwardly directed outer track or surface 13 that is also frustoconical and centered on the axis A and that is forwardly outwardly tapered. The pitch of the screwthread 17 is such that when the locking ring 12 is rotated in the opening direction, that is in the direction to spread the jaws 3, the ring 12 will move axially forward so that its surface 13 will cam the balls 11 more deeply into the groove 14.

Seen in cross section through the groove 14 as shown in FIG. 2, the surface 13 is formed by a family of lines perpendicular to a bisector 18 of the angle formed between the contact points P1 and P3 where the balls 11 contact the surfaces 15 and 16, respectively. Thus these points P1 and P3 are equidistant from the point P2 where each ball 11 engages the surface 13. In use therefore the balls 11 will rotate about axes 11' which run through the points P2 and the center points C of balls 11.

Figure 3:
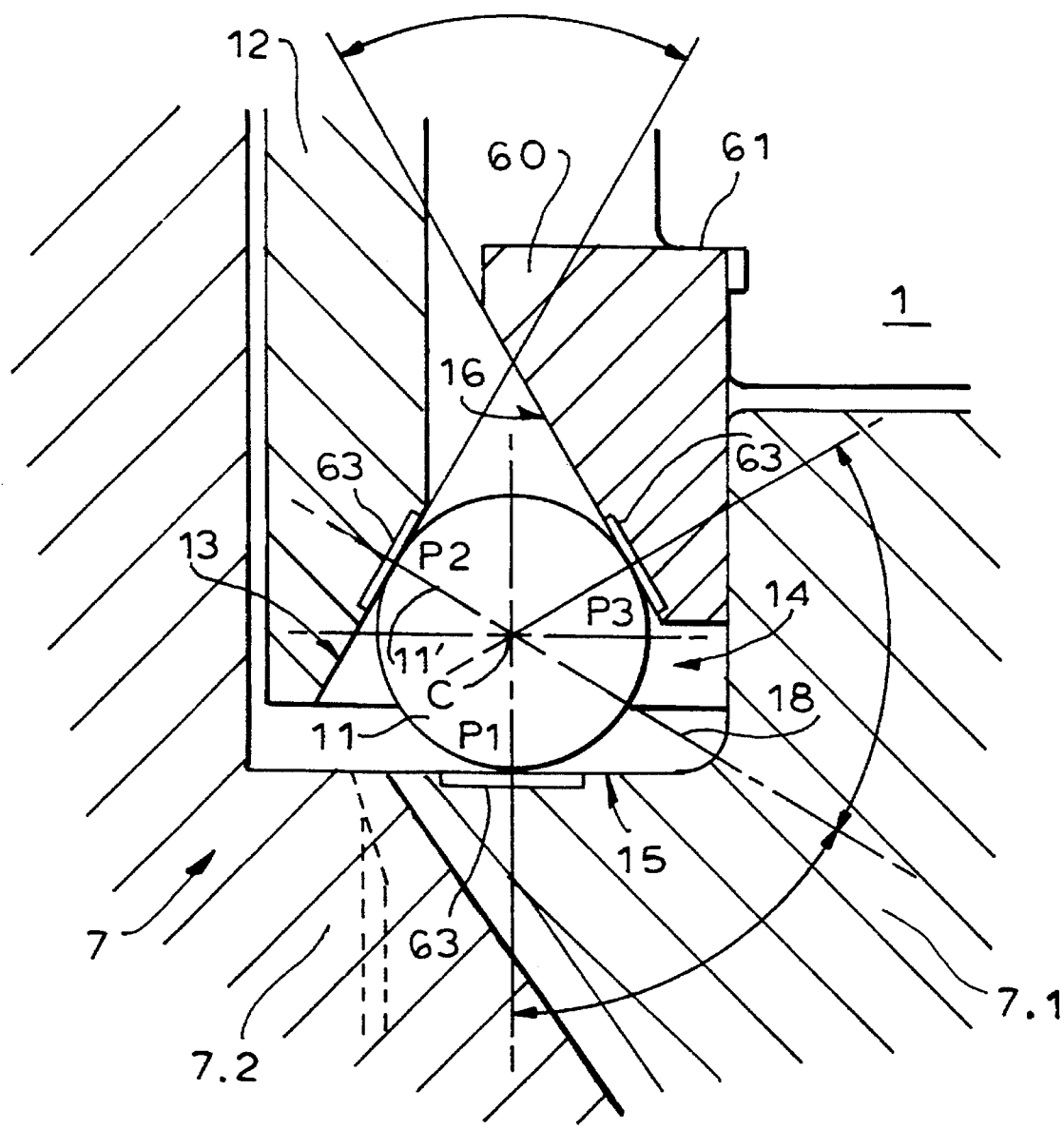
FIG. 3 is a view like FIG. 2 of a detail of FIG. 10.
Figure 4:
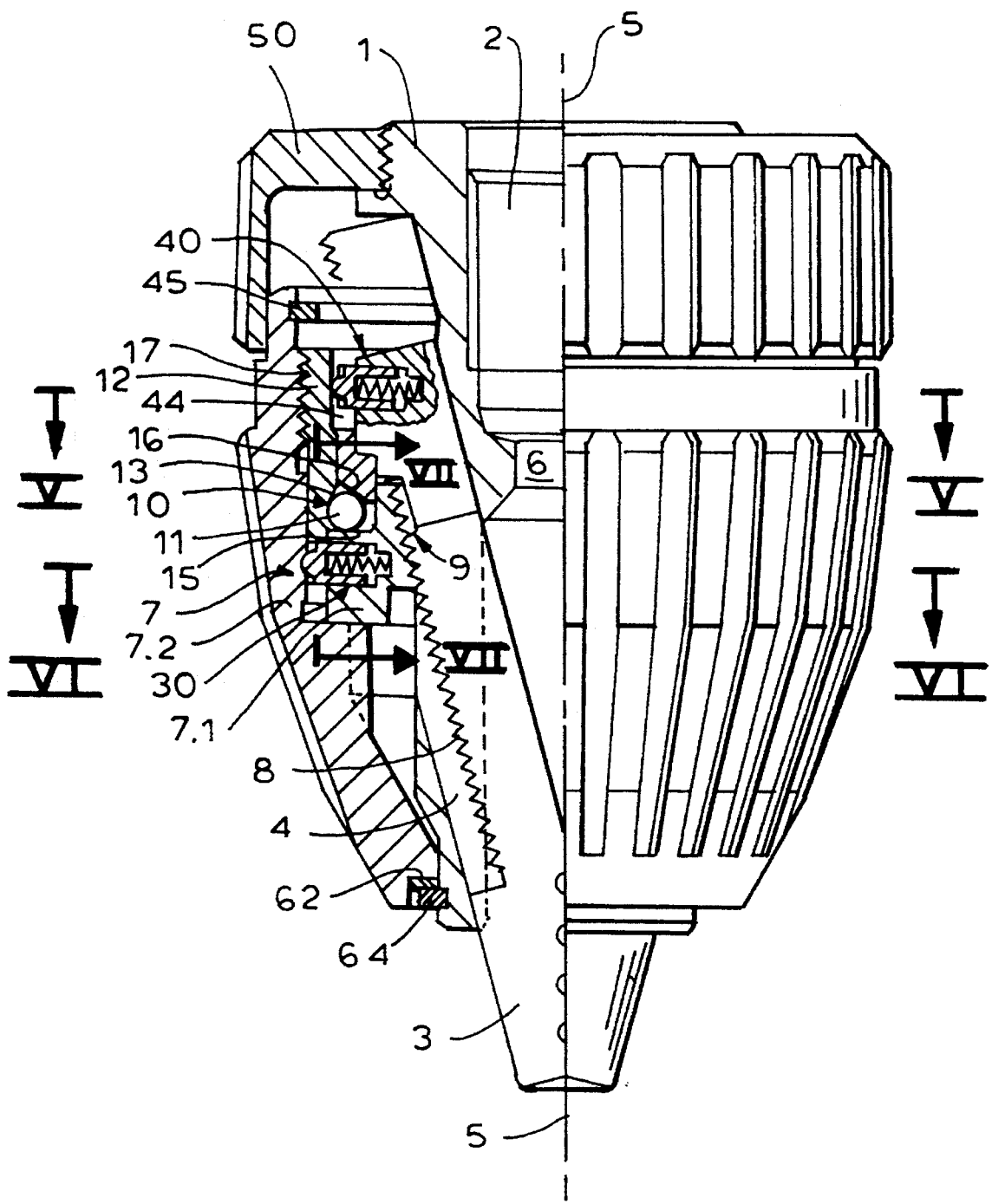
FIG. 4 is a view like FIG. 1 of a second embodiment of the invention.

In the variant of FIG. 3 the three points P1, P2, and P3 are equispaced at 120°, In addition the surfaces 13, 15, and 16 are each formed with a row of shallow pockets 63, in effect giving these surfaces 13, 15, and 16 a gently corrugated shape that prevents loosening of the chuck and increases the holding force.

Between the locking ring 12 and the chuck body 1 is a coupling 20 comprised of a latch pin 22 urged axially backward by a spring 21 into an array of recesses 23 formed on a washer 24 fixed on the body 17. Thus while the ring 12 can rotate on the body 1, it must be rotated relative to the body 1 with a torque sufficient to cam the pin 22 back down out of the recesses 23. In a manner described below with respect to similar structure, the coupling 20 is set to offer a different resistance depending on the rotation direction of the sleeve 7 relative to the body 1. More particularly the force needed to overcome the coupling 20 and rotate the ring 12 on the body 1 in the opening direction is smaller than the force needed to overcome the coupling 20 and rotate the ring 12 on the body 1 in the opposite closing direction. The coupling 20 prevents the locking ring 12 from rotating on the body 1 when the ring 7 is turned with the chuck open, in order for instance to change the opening size.

In addition between the ring 12 and sleeve 7 is another coupling 25 constituted as an O-ring 26 set in a groove 27 on the sleeve 7 and bearing radially inward on an outer surface of the ring 12. The torque needed to overcome the coupling 25 and rotate the ring 12 and sleeve 7 relative to each other lies between the two different threshold or release torques of the coupling 20.

To tighten or close the chuck, it is gripped with one hand on the adjustment sleeve 7 and the other on the locking ring 12. The adjustment sleeve 7 is rotated in the closing direction until the jaws 3 engage the unillustrated drill bit, thereby preventing further rotation of the adjustment sleeve 7 on the chuck body 1. In this condition the coupling 20 will slip so that now the locking ring 12 is rotated in the opposite opening direction relative to the chuck body 1 and thus the screwthread will shift the surface 13 forward. This cams in the balls 11 thereby forcing the sleeve 7 and body 1 axially apart to the extent permitted by the small amount of axial play between these parts, so that a final amount of clamping force is brought to bear, with a very large mechanical advantage.

If when the chuck is tightened on a tool the drilling action exerts a torque on the adjustment sleeve 7 in the opening direction the fact that this sleeve 7 is connected by the coupling 20 to the ring 12 will cause same to tighten down even more. This is therefore a self-tightening action.

To loosen or open the chuck, it is held the same way but the adjustment sleeve 7 is rotated oppositely in the opening direction. At the start the sleeve 7 is, however, so locked to the jaws 3 by the screwthread 9 that only the locking ring 12 will rotate relative to the body 1 and draw axially back. This reduces the clamping force until the adjustment sleeve 7 can also rotate whereupon the ring 12 will be locked to the body 1 by the coupling 20.

In the embodiments of FIGS. 4 through 14 the screwthread 17 is located such that actuation of the adjustment sleeve automatically results in the appropriate actuation of the locking ring. To this end as seen in FIGS. 4 through 9 the two parts 7.1 and 7.2 of the sleeve 7 are axially fixed together but relatively rotatable about the axis 5. In addition these parts 7.1 and 7.2 are rotationally coupled together by a coupling 30 formed as shown in FIGS. 6 and 7 by a pin 32 that is radially displaceable in the part 7.1 and that is urged radially outward through a notch 33 in the ring 12 by a spring 31 to engage in any of an array of recesses 34 formed on the part 7.2. Under any circumstances, the pin 32 rotationally couples the inner part 7.1 to the locking ring 12 but the part 7.1 is only coupled to the part 7.2 when the torque exerted between them is insufficient to cam in the pin 32.

The hand of the screwthread 17, which is provided between the locking ring 12 and the outer part 7.1, is such that when the part 7.2 is rotated relative to the part 7.1 in the closing direction the ring 12 is moved axially forward to push the balls 11 into the groove, thereby increasing the tool-clamping force.

In addition in the embodiment of FIGS. 4 through 9 a coupling 40 is provided to rotationally couple the ring 12 to the body 1 except in a rearmost position of the ring 12 shown in FIGS. 8 and 9. As best seen in FIGS. 5 and 9 this coupling 40 has a pin 42 radially displaceable in the body 1 and urged radially outward by a spring 41 to engage in any of an array of axially extending and radially inwardly open grooves 43 formed in the ring 12. An annular and radially inwardly open groove 44 interconnects the axial front ends of the grooves 43 so that when the head of the pin 42 is engaged therein, the ring 12 can rotate on the body 1. In this rearmost position the ring 12 bears on a snap ring or abutment 45 set in the rear end of the outer part 7.2. The torque necessary to overcome the coupling 40 is, obviously, much greater than that needed to cause the coupling 30 to slip.

To tighten the chuck of FIGS. 4 through 9, the outer sleeve part 7.2 is gripped in one hand while the other hand grips a ring 50 fixed on the body 1 and the sleeve part 7.2 is rotated in the closing direction until the jaws 3 engage the shaft of the tool being chucked. This arrests the sleeve part 7.1 and the locking ring 12 which up to then had been rotating together. The first coupling 30 slips so that the outer sleeve part 7.2 rotates relative to the ring 12 and, as a result of the screwthread 17, the locking ring 12 is moved axially forward to increase the clamping pressure, leaving the system in the position of FIG. 4. The coupling 30 will click as it slips, indicating to the user that he or she is in the final stages of tightening.

To loosen the chuck, the part 7.2 is oppositely rotated in the opening direction. To start with the jaws 3 clamped on the tool will prevent the inner part 7.1 from rotating, and the coupling 30 will slip to allow the part 7.2 to rotate relative to the ring 12 to pull same axially back and relieve much of the clamping pressure. Once the pressure is fairly low, the coupling 30 will stop slipping and continued reverse rotation will reverse-rotate the ring 7.1 and open the jaws. Once the jaws 3 are completely clear of the tool, the parts 7.1, 7.2, and 12 all rotate together.

It can happen that the drill comes loose between the jaws 3. In order to ensure that when this happens the locking ring 12 is in the rear FIG. 8 position, the second coupling 40 acts to prevent the ring 12 from rotating until the pin 43 enters into the groove 40, whereupon the ring 12 is free to rotate with the part 7.2.

In the arrangement of FIGS. 10 through 14 the locking ring 12 is not rotatable on the outer sleeve part 7.1 but is axially shiftable thereon, to which end the ring 12 is formed with axial ridges or splines 70 that slide in axial grooves 71 on the inner surface of the sleeve part 7.2. The coupling 30 is here arranged to work axially, and the recesses 34 are formed with differently angled front and rear flanks as shown in FIG. 12a to resist relative rotation of the parts 7.1 and 7.2 with different forces. Alternately as shown in FIG. 12b the end of the pin 32 could be formed complimentarily to the sawtooth-shaped grooves 34 to heighten this effect.

Figure 10:
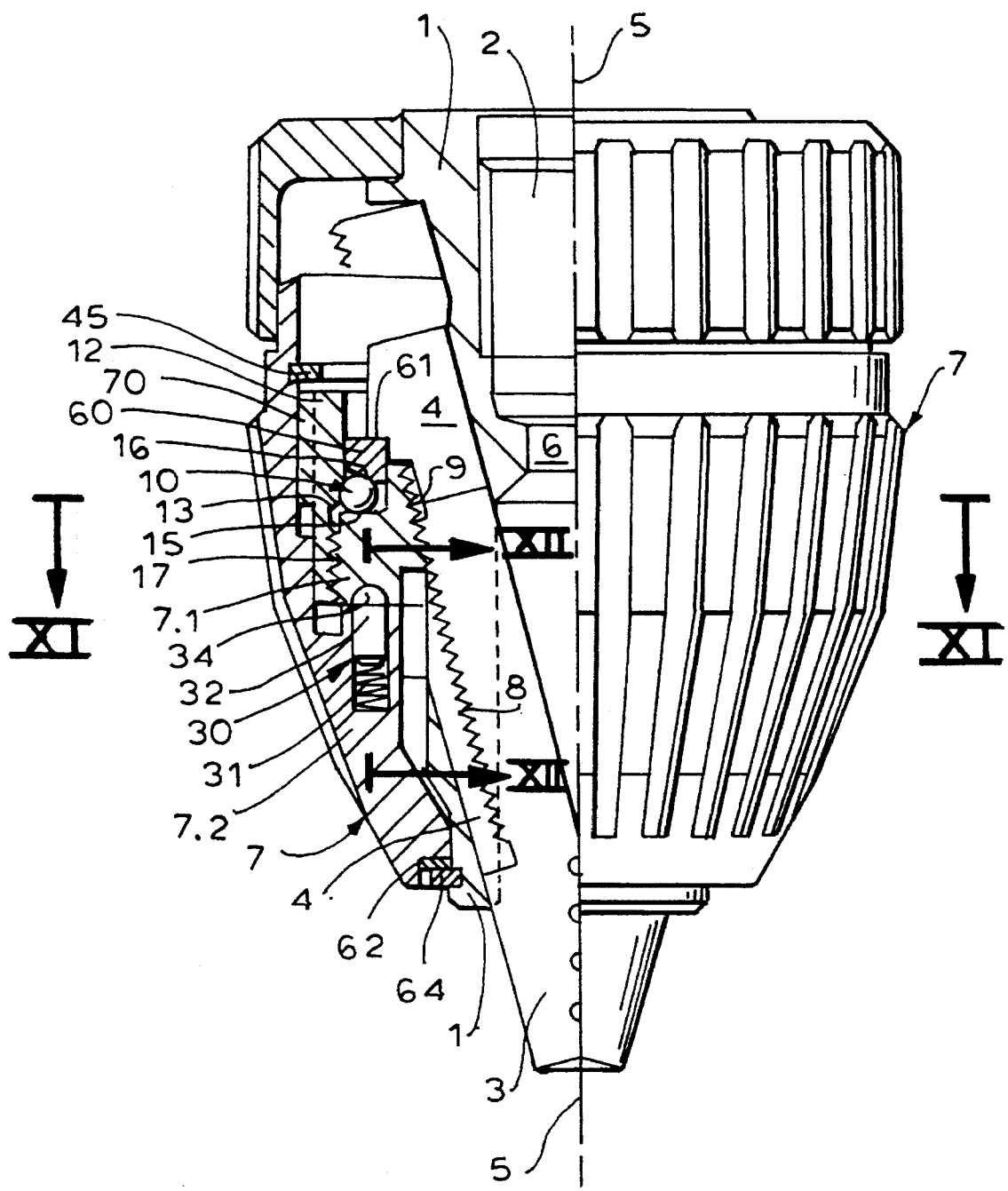
FIG. 10 is a view like FIG. 1 of a third embodiment of the invention.
Figure 11:
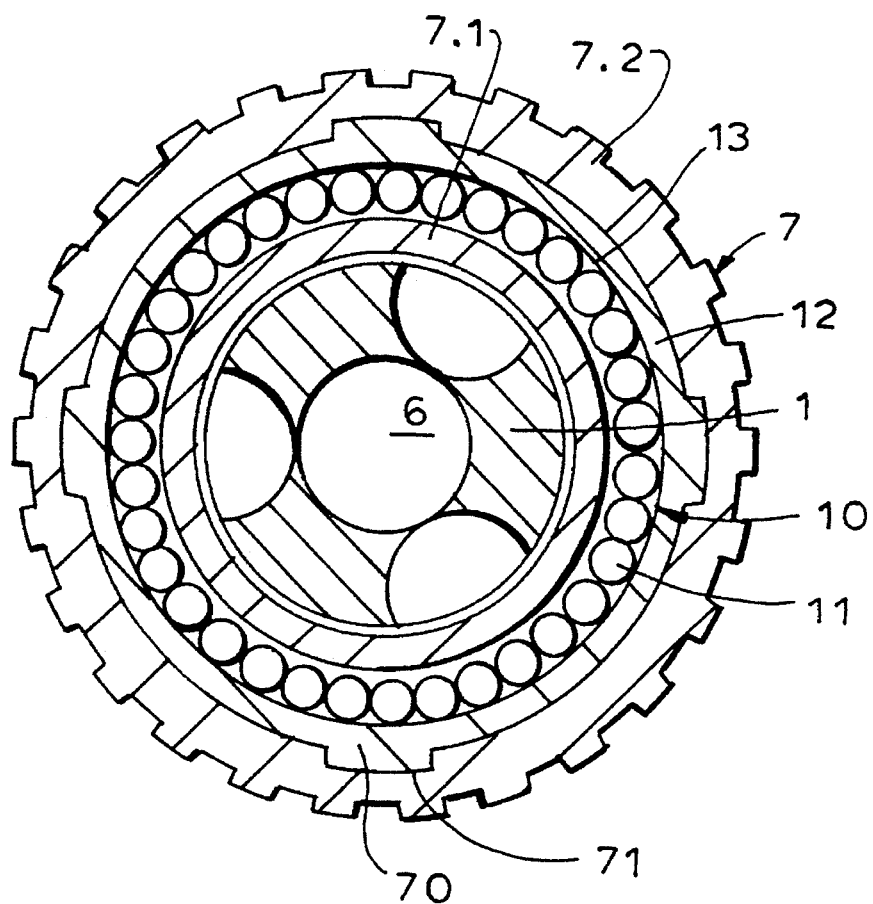
FIGS. 11 and 12a are sections taken along respective lines XI—XI and XII—XII of FIG. 10.
Figure 12A:
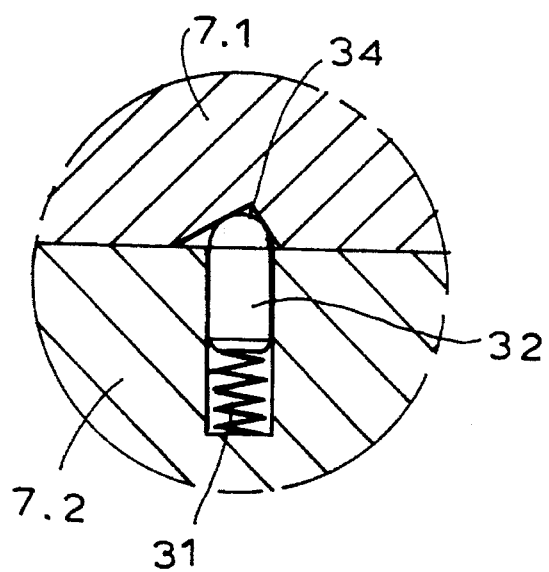
Figure 12B:
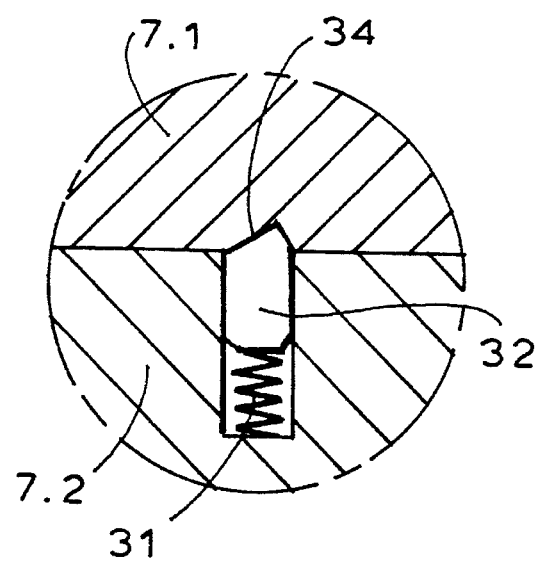
FIG. 12b is a view like 12a of a variant on the structure of FIG. 10.
Figure 13:
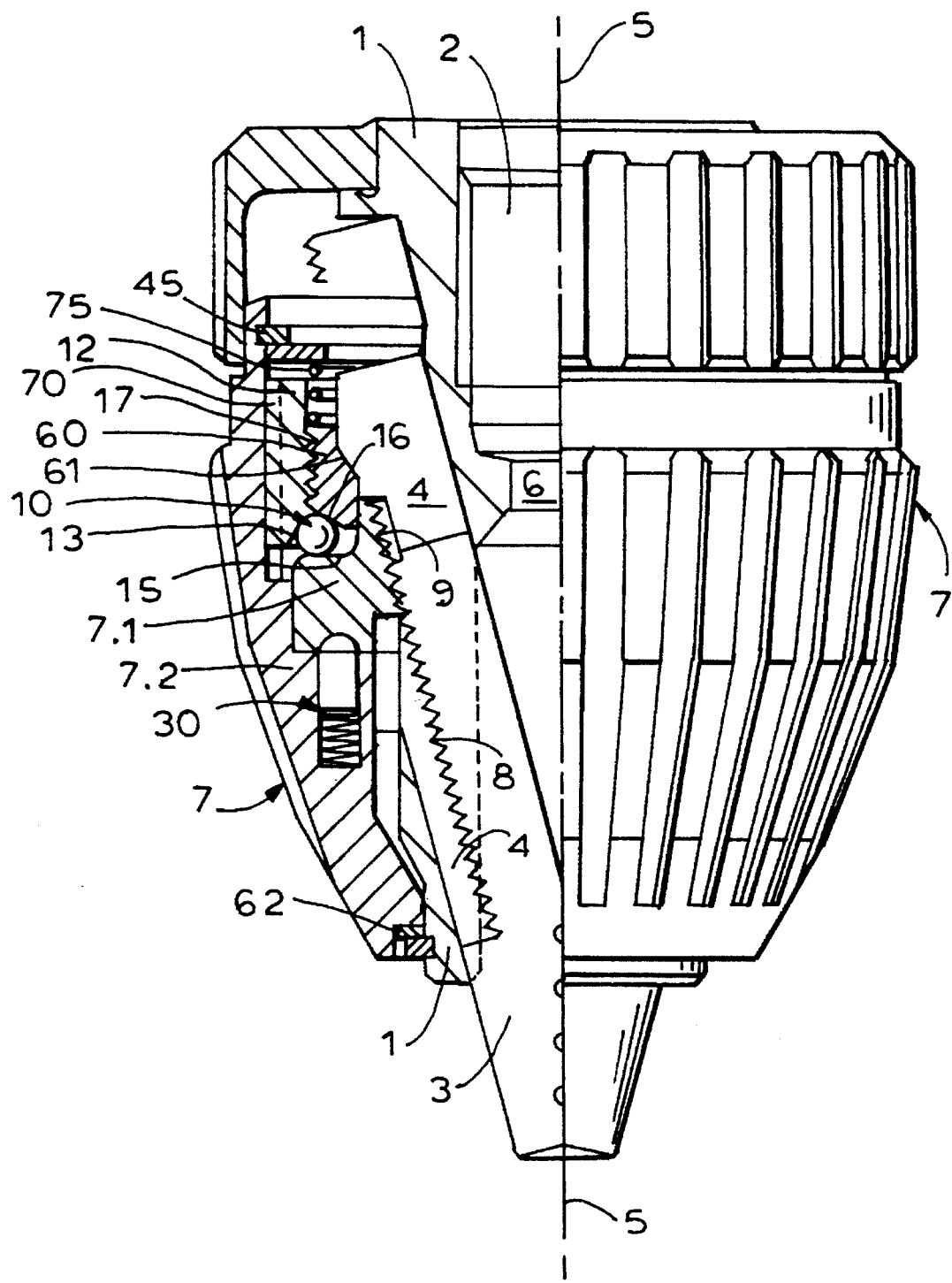
FIGS. 13 and 14 are views like FIG. 1 of fourth and fifth embodiments of the invention.
Figure 14:
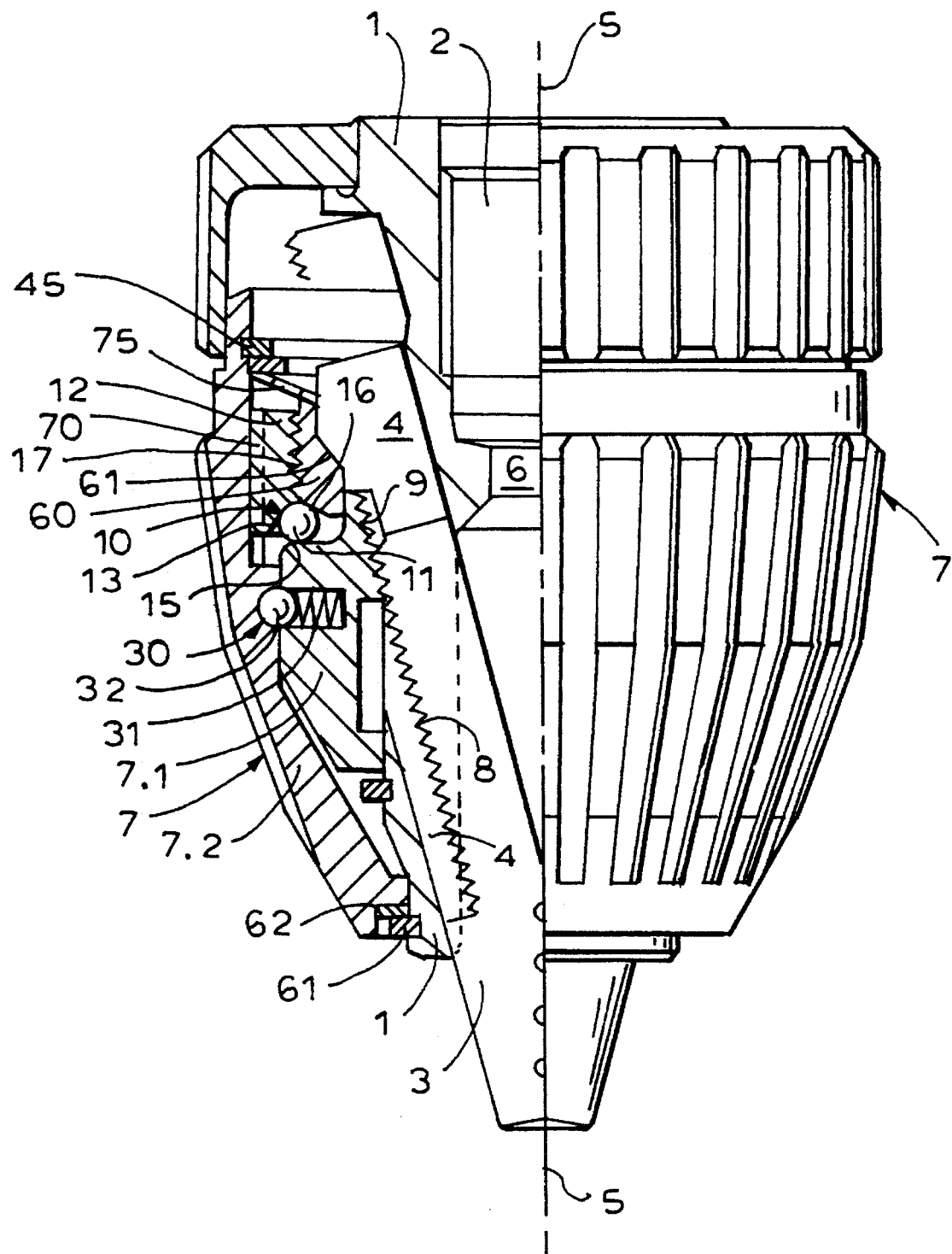

In FIGS. 10 through 12 the screwthread 17 is provided between the ring 12 and the inner part 7.1 while in FIGS. 13 and 14 it is provided between the ring 12 and a ring 60 that forms the surface 16 and that can rotate about the axis 5 while being urged axially forward by a spring 75. This ring 60 can bear axially backward against a frustoconical shoulder 61 of the body 1 with a complementary rear surface. In FIG. 13 this spring 75 is a coil spring while in FIG. 14 it is a spring washer.

The arrangements of FIGS. 10 through 12 function substantially identically to the systems of FIGS. 1 through 9.

In the systems of FIGS. 13 and 14 when the chuck is open the spring 75 pushes the ring 60 so far forward that it leaves engagement with the shoulder surface 61 and can, therefore, rotate with the sleeve 7 and ring 12 to change the chuck diameter setting. Relative displacements between the ring 60 and the ring 12 do not occur at the screwthread 17. When, however, the chuck is to be closed or tightened, the sleeve part 7.1 pushes the ring 60 by means of the bearing 10 against the shoulder 61 so that the friction between the ring 60 and body 1 prohibits further rotation of the ring 60 relative to the body 1. Thus further rotation of the part 7.2 in the closing direction causes the coupling 30 to slip and allows the part 7.2 to rotate with the ring 12 to move down the surface 13 and increase the clamping action.

I claim:

1. A drill chuck comprising:
   a chuck body centered on and rotatable about an axis and formed with
      a plurality of jaw guides angularly spaced about the axis and all inclined axially forwardly and with
      an axially directed annular inner bearing track centered on the axis;
   respective jaws in the guides each formed with a row of teeth;
   an adjustment sleeve generally axially fixed on the body and formed with an adjustment screwthread meshing with the rows of teeth of the jaws, the sleeve being rotatable on the body in a tightening direction for displacing the jaws axially forward and radially toward one another and in an opposite loosening direction for displacing the jaws axially backward and radially away from one another, the adjustment sleeve being formed with
      an axially directed annular inner bearing track centered on the axis and axially confronting the inner bearing track of the chuck body, one of the inner bearing tracks being substantially planar and perpendicular to the axis and the other inner bearing track being substantially frustoconical and angled outwardly away from the one inner bearing track;
   an array of bearing balls axially engaged between the inner bearing tracks;
   a locking ring rotatable on the chuck body and forming
      a radially inwardly directed and substantially frustoconical outer track bearing radially inward on the bearing balls; and
   means including a tightening screwthread on the locking ring for axially displacing the locking ring relative to the chuck body on relative rotation of the adjustment sleeve and locking ring.

2. The drill chuck defined in claim 1 wherein the tightening screwthread is also formed in part on the chuck body and has a hand such that when the locking ring is rotated in the chuck body in the tightening direction the locking ring moves axially and cams in the balls with the outer track.

3. The drill chuck defined in claim 2 wherein the tightening screwthread is of such a hand that when the locking ring is rotated in the tightening direction the locking ring moves axially forward on the chuck body, the outer track being flared axially forwardly.

4. The drill chuck defined in claim 2, further comprising
   a first coupling engaged between the locking ring and the chuck body and resisting relative rotation so long as the locking ring and chuck body are relatively rotated with less than a predetermined torque.

5. The drill chuck defined in claim 4 wherein the first coupling is constituted such that it resists relative rotation in the tightening direction with a force greater than the force with which it resists relative rotation in the opposite direction.

6. The drill chuck defined in claim 4 wherein the first coupling includes
   a pin displaceable in the body toward and away from the locking ring,
   an annular array of recesses in the locking ring in which the pin is engageable, and
   a spring braced between the pin and the body urging the pin toward the locking ring.

7. The drill chuck defined in claim 6 wherein the recesses each have a pair of differently inclined and angularly oppositely directed flanks engageable by the pin, whereby the first coupling resists relative rotation in the tightening direction with a force greater than the force with which it resists relative rotation in the opposite direction.

8. The drill chuck defined in claim 2, further comprising
   a second coupling engaged between the locking ring and the adjustment sleeve and resisting relative rotation of the ring and sleeve with a predetermined force.

9. The drill chuck defined in claim 8 wherein the second coupling is formed by an O-ring set in the adjustment sleeve and bearing radially inwardly on the locking ring.

10. The drill chuck defined in claim 1 wherein the sleeve includes:
    an inner part formed with the respective inner track and part of the adjustment screwthread, and
    an outer part rotatable relative to the inner part,
    the chuck further comprising
    a first coupling engaged between the inner and outer parts resisting relative rotation thereof so long as the inner and outer parts are relatively rotated with less than a predetermined torque.

11. The drill chuck defined in claim 10, further comprising
    means for rotationally permanently coupling the locking ring with the inner part, the tightening screwthread being between the outer part and the locking ring.

12. The drill chuck defined in claim 10, further comprising
    a second coupling engaged between the chuck body and the locking ring and rotationally coupling same together except in a rearmost position of the locking ring on the chuck body.

13. The drill chuck defined in claim 12 wherein the second coupling includes
    a pin radially displaceable in the chuck body,
    an array of axially extending grooves in the locking ring in which the pin is radially engageable,
    a spring urging the pin radially into the grooves, and
    an annular groove in which the pin is engageable in the rearmost position of the locking ring.

14. The drill chuck defined in claim 13 wherein the outer part is provided with an abutment ring against which the locking ring is engaged in the rearmost position.

15. The drill chuck defined in claim 10 wherein the locking ring is rotationally fixed and axially displaceable on the outer part, the chuck body including a chuck-body ring that forms the respective inner track and that is axially shiftable on the chuck body, the chuck body and chuck-body ring having axially engageable annular surfaces that when engaged rotationally couple the chuck body and chuck-body ring together, the chuck further comprising
    a spring urging the axially engageable surfaces apart.

16. The drill chuck defined in claim 15 wherein the axially engageable surfaces are substantially frustoconical and centered on the axis.

17. The drill chuck defined in claim 15 wherein the spring urging the axially engageable surfaces apart is braced between the sleeve and the chuck-body ring.

18. The drill chuck defined in claim 1 wherein the balls each engage the tracks at three angularly offset locations, the location at which each ball engages the outer track forming with the center of the respective ball a line generally bisecting an angle formed between lines between the other locations and the center of the ball.

19. The drill chuck defined in claim 18 wherein the locations are angularly equispaced around the balls.

20. The drill chuck defined in claim 1 wherein at least one of the tracks is formed with alternating hills and valleys.

* * * * *